(12) United States Patent
McVicar

(10) Patent No.: US 7,086,949 B2
(45) Date of Patent: Aug. 8, 2006

(54) CONVERTIBLE SINGLE-TURN TO MULTI-TURN GAMING STEERING WHEEL UTILIZING SLIDING STOPS

(75) Inventor: David McVicar, El Dorado, CA (US)

(73) Assignee: Logitech Europe S.A., Romanel-sur Morges (CH)

( * ) Notice: Subject to any disclaimer, the term of this patent is extended or adjusted under 35 U.S.C. 154(b) by 467 days.

(21) Appl. No.: 10/434,763

(22) Filed: May 8, 2003

(65) Prior Publication Data

US 2004/0224764 A1 Nov. 11, 2004

(51) Int. Cl.
*A63F 13/00* (2006.01)
(52) U.S. Cl. .............................. 463/36; 463/37; 463/38
(58) Field of Classification Search ............ 463/36–39; 434/29, 62
See application file for complete search history.

(56) References Cited

U.S. PATENT DOCUMENTS

| | | | | |
|---|---|---|---|---|
| 5,044,956 A | * | 9/1991 | Behensky et al. | 434/45 |
| 5,547,383 A | * | 8/1996 | Yamaguchi | 434/62 |
| 5,823,876 A | * | 10/1998 | Unbehand | 463/37 |
| 5,829,745 A | * | 11/1998 | Houle | 273/148 B |
| 5,868,573 A | * | 2/1999 | Kerby et al. | 434/29 |
| 5,915,786 A | * | 6/1999 | Kotani | 297/217.7 |
| 5,989,123 A | * | 11/1999 | Tosaki et al. | 463/37 |
| 6,050,897 A | * | 4/2000 | Suzuki et al. | 463/37 |

FOREIGN PATENT DOCUMENTS

JP  03077577 A  4/1991

* cited by examiner

*Primary Examiner*—John M. Hotaling, II
(74) *Attorney, Agent, or Firm*—Townsend and Townsend and Crew LLP

(57) ABSTRACT

Embodiments of the present invention are directed to a control device for a steering wheel. In one embodiment, a control device for a steering wheel comprises a frame including a left frame stop and a right frame stop. A rotational shaft includes a timing member, a counterclockwise rotational stop and a clockwise rotational stop. The rotational shaft is rotatable relative to the frame in clockwise and counterclockwise directions from a neutral position. A multi-turn slider includes a timing rack configured to engage the timing member of the rotational shaft and to slide in opposite directions relative to the frame with the timing member rotating in counterclockwise and clockwise directions. The multi-turn slider includes a left multi-turn stop disposed on a left side of the timing rack and a right multi-turn stop disposed on a right side of the timing rack to move with the timing rack. The frame stop of the frame blocks the left multi-turn stop of the multi-turn slider to prevent further rotation of the rotational shaft in the counterclockwise direction only after the rotational shaft is turned from the neutral position counterclockwise by more than 180°. The right frame stop blocks the right multi-turn stop of the multi-turn slider to prevent further rotation of the rotational shaft in the clockwise direction only after the rotational shaft is turned from the neutral position clockwise by more than 180°.

20 Claims, 6 Drawing Sheets

CONVERTIBLE SINGLE-TURN TO MULTI-TURN GAMING STEERING WHEEL UTILIZING SLIDING STOPS

CROSS-REFERENCES TO RELATED APPLICATIONS

NOT APPLICABLE

BACKGROUND OF THE INVENTION

The present invention relates to gaming devices and, more particularly, to gaming steering wheel control devices.

Heretofore, gaming steering wheels for PC/Console gaming or the like are limited in operation to rotational angles much less than 360 degrees in both clockwise and counterclockwise directions combined. A rotational range of within 360° limits the steering wheel to a single turn. It is advantageous to provide a multi-turn steering wheel operable beyond the 360° limit.

BRIEF SUMMARY OF THE INVENTION

Embodiments of the present invention are directed to a control device for a steering wheel which allows the steering wheel to operate as a multi-turn mechanism beyond the 360° limit. The shaft coupled with the steering wheel includes a timing member which engages a timing rack of a multi-turn slider having two multi-turn stops on opposite sides. Rotation of the shaft causes the multi-turn slider to slide in opposite directions between the two multi-turn stops. The two multi-turn stops interfere with the rotation of the shaft to prevent further rotation of the shaft in the counterclockwise direction and the clockwise direction, respectively, after the shaft has rotated by more than 180° in the counterclockwise and the clockwise direction, respectively, from a "centered" or neutral position. A single-turn control member may be provided to convert the control device from a multi-turn mode in which the shaft rotation is limited by the multi-turn stops, to a single-turn mode in which the shaft rotation is limited by single-turn stops of the single-turn control member restricting the rotation to within 180° in the counterclockwise direction and within 180° in the clockwise direction.

In accordance with an aspect of the present invention, a control device for a steering wheel comprises a frame including a left frame stop and a right frame stop. A rotational shaft includes a timing member, a counterclockwise rotational stop and a clockwise rotational stop. The rotational shaft is rotatable relative to the frame in clockwise and counterclockwise directions from a neutral position. A multi-turn slider includes a timing rack configured to engage the timing member of the rotational shaft and to slide in opposite directions relative to the frame with the timing member rotating in counterclockwise and clockwise directions. The multi-turn slider includes a left multi-turn stop disposed on a left side of the timing rack and a right multi-turn stop disposed on a right side of the timing rack to move with the timing rack. The left frame stop of the frame blocks the left multi-turn stop of the multi-turn slider to prevent further rotation of the rotational shaft in the counterclockwise direction only after the rotational shaft is turned from the neutral position counterclockwise by more than 180°. The right frame stop of the frame blocks the right multi-turn stop of the multi-turn slider to prevent further rotation of the rotational shaft in the clockwise direction only after the rotational shaft is turned from the neutral position clockwise by more than 180°.

In some embodiments, the timing member comprises a timing gear and the timing rack comprises a timing gear rack. The left frame stop blocks the left multi-turn stop and the left multi-turn stop blocks the counterclockwise rotational stop to prevent further rotation of the rotational shaft in the counterclockwise direction only after the rotational shaft is turned from the neutral position counterclockwise by more than 360°, and the right frame stop blocks the right multi-turn stop and the right multi-turn stop blocks the clockwise rotational stop to prevent further rotation of the rotational shaft in the clockwise direction only after the rotational shaft is turned from the neutral position clockwise by more than 360°. The left multi-turn stop is spaced from the left frame stop by a distance substantially equal to a distance between the right multi-turn stop and the right frame stop with the rotational shaft in the neutral position. The left frame stop and the right frame stop are formed as a single frame stop member having a left side for blocking the left multi-turn stop and a right side for blocking the right multi-turn stop of the multi-turn slider. The counterclockwise rotational stop and the clockwise rotational stop are formed as a single rotational stop member having one side for contacting the left multi-turn stop and another side for contacting the right multi-turn stop of the multi-turn slider.

In accordance with another aspect of the invention, a control device for a steering wheel comprises a frame including a left frame stop and a right frame stop. A rotational shaft includes a timing member, a counterclockwise rotational stop and a clockwise rotational stop. The rotational shaft is rotatable relative to the frame in clockwise and counterclockwise directions from a neutral position to move the rotational stops along paths of travel. A single-turn control member has a left single-turn stop and a right single-turn stop. The single-turn control member is movable, between a multi-turn mode position in which the left single-turn stop and the right single-turn stop are disposed outside the paths of travel of the counterclockwise rotational stop and the clockwise rotational stop, and a single-turn mode position in which the left single-turn stop is disposed within the path of travel of the counterclockwise rotational stop to prevent rotation of the rotational shaft in the counterclockwise direction by more than 180° from the neutral position and the right single-turn stop is disposed within the path of travel of the clockwise rotational stop to prevent rotation of the rotational shaft in the clockwise direction by more than 180° from the neutral position. A multi-turn slider includes a timing rack configured to engage the timing member of the rotational shaft and to slide in opposite directions relative to the frame with the timing member rotating in counterclockwise and clockwise directions. The multi-turn slider includes a left multi-turn stop disposed on a left side of the timing rack and a right multi-turn stop disposed on a right side of the timing rack to move with the timing rack. With the single-turn control member in the multi-turn mode position, the left frame stop blocks the left multi-turn stop of the multi-turn slider to prevent further rotation of the rotational shaft in the counterclockwise direction only after the rotational shaft is turned from the neutral position counterclockwise by more than 180°, and the right frame stop blocks the right multi-turn stop of the multi-turn slider to prevent further rotation of the rotational shaft in the clockwise direction only after the rotational shaft is turned from the neutral position clockwise by more than 180°.

In some embodiments, with the single-turn control member in the single-turn mode position, the left single-turn stop is disposed within the path of travel of the counterclockwise rotational stop and is blocked by the left frame stop to prevent rotation of the rotational shaft in the counterclockwise direction by more than 180° from the neutral position, and the right single-turn stop is disposed within the path of travel of the clockwise rotational stop and is blocked by the right frame stop to prevent rotation of the rotational shaft in the clockwise direction by more than 180° from the neutral position. The left single-turn stop and the right single-turn stop are formed as a single single-turn stop member having a left side for blocking the counterclockwise rotational stop and a right side for blocking the clockwise rotational stop of the rotational shaft.

In accordance with another aspect of the present invention, a control device for a steering wheel comprises a frame including a left frame stop and a right frame stop. A rotational shaft includes a timing member, a counterclockwise rotational stop and a clockwise rotational stop. The rotational shaft is rotatable relative to the frame in clockwise and counterclockwise directions from a neutral position. The control device further comprises a multi-turn mechanism, coupled with the timing member of the rotational shaft, for prevent further rotation of the rotational shaft in the counterclockwise direction only after the rotational shaft is turned from the neutral position counterclockwise by more than 180° and preventing further rotation of the rotational shaft in the clockwise direction only after the rotational shaft is turned from the neutral position clockwise by more than 180°.

In some embodiments, the control device further comprises a single-turn mechanism, operable between a multi-turn mode and a single-turn mode, for preventing rotation of the rotational shaft in the counterclockwise direction by more than 180° and in the clockwise direction by more than 180° from the neutral position in the single-turn mode, and not interfering with rotation of the rotational shaft in the multi-turn mode.

DETAILED DESCRIPTION OF THE INVENTION

Figure 1:
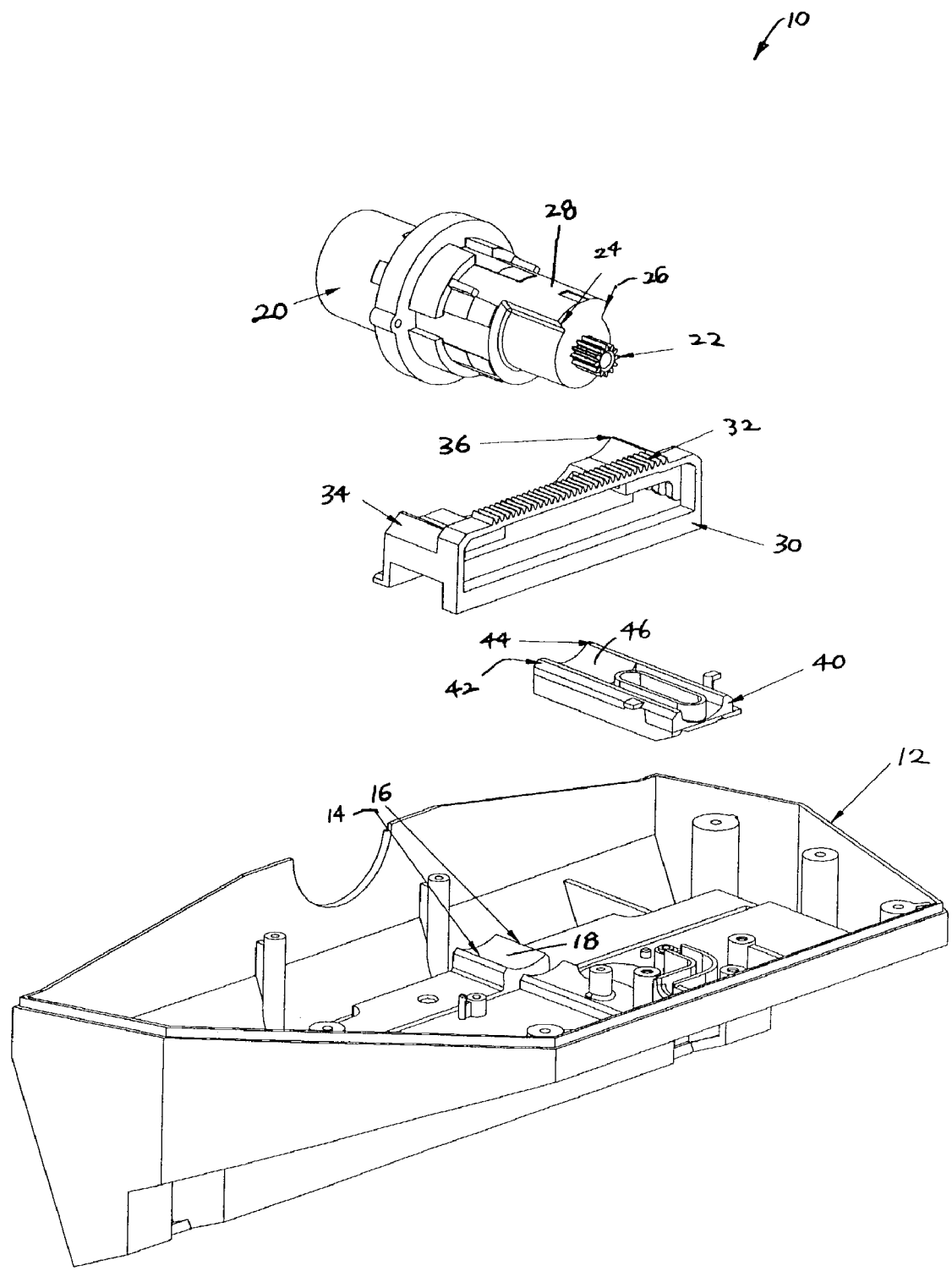
FIG. 1 is an exploded perspective view of a steering wheel control device according to an embodiment of the present invention.

FIG. 1 shows a steering wheel control device 10 including a frame 12 which has a left frame stop 14 and a right frame stop 16. In the embodiment shown, the left frame stop 14 and the right frame stop 16 are formed as a single frame stop member 18 having a left side serving as the left frame stop and a right side serving as the right frame stop. A rotational shaft 20 is supported on the frame 12, and is configured to be coupled to a steering wheel. The shaft 20 is rotatable relative to the frame 12 in counterclockwise and clockwise directions from a "centered" or neutral position. The shaft 20 includes a timing member which is desirably a timing gear 22. The shaft 20 further includes a counterclockwise rotational stop 24 and a clockwise rotational stop 26. In the embodiment shown, the counterclockwise rotational stop 24 and the clockwise rotational stop 26 are formed as a single rotational stop member 28 having one side which serves as the counterclockwise rotational stop and another side which serves as the clockwise rotational stop.

Figure 2:
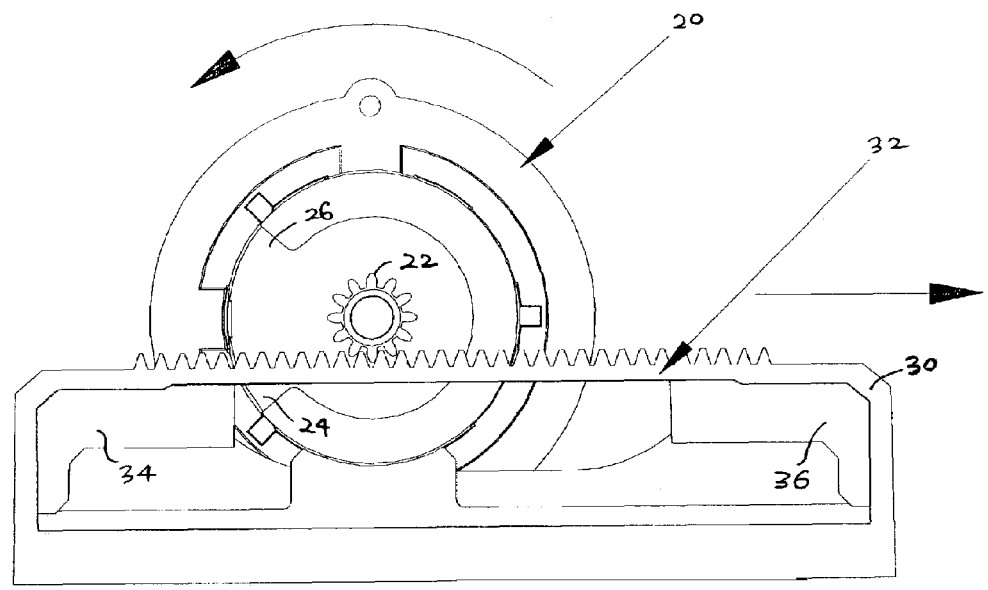
FIG. 2 is an elevational view of the rotational shaft and the multi-turn slider in the steering wheel control device of FIG. 1 illustrating counterclockwise rotation of the shaft.
Figure 3:
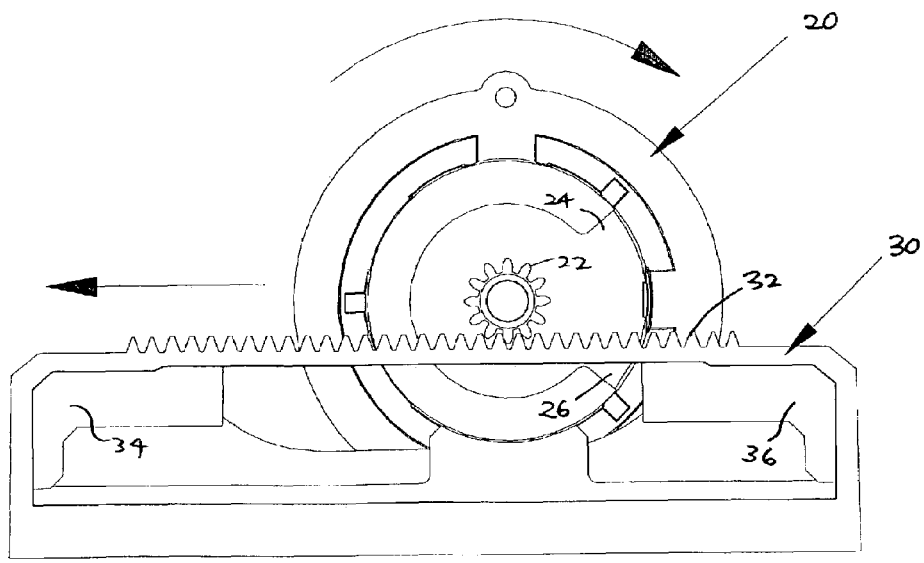
FIG. 3 is an elevational view of the rotational shaft and the multi-turn slider in the steering wheel control device of FIG. 1 illustrating clockwise rotation of the shaft.

A multi-turn slider 30 includes a timing rack 32 which is configured to engage the timing member 22 of the shaft 20 and to slide in opposite directions relative to the frame 12 when the timing member 22 rotates in counterclockwise and clockwise directions. In the embodiment shown, the timing rack 32 is a timing gear rack 32 having gear teeth which engage the gear teeth of the timing gear 22. As seen in FIGS. 2 and 3, the multi-turn slider 30 slides to the right when the shaft 20 rotates in the counterclockwise direction, and slides to the left when the shaft 20 rotates in the clockwise direction. The multi-turn slider 30 further includes a left multi-turn stop 34 disposed on the left side of the timing rack 32 and a right multi-turn stop 36 disposed on the right side of the timing rack 32 to move with the timing rack 32. The multi-turn stops 34, 36 of the multi-turn slider 30 control the multi-turn mode of operation of the control device 10. In the embodiment shown, the left multi-turn stop 34 is spaced from the left frame stop 14 by a distance substantially equal to the distance between the right multi-turn stop 36 and the right frame stop 16 when the shaft 20 is in the neutral position. This produces a rotational range of the shaft that is substantially equal in the counterclockwise and the clockwise direction in the multi-turn mode of operation.

A single-turn control member or slider 40 may be used to convert the steering wheel control device 10 from a multi-turn mode to a single-turn mode, as discussed in more detail below. The single-turn slider 40 includes a left single-turn stop 42 and a right single-turn stop 44. In the embodiment shown in FIG. 1, the left single-turn stop 42 and the right single-turn stop 44 are formed as a single single-turn stop member 46 having a left side which serves as the left single-turn stop and a right side which serves as the right single-turn stop.

Figure 4:
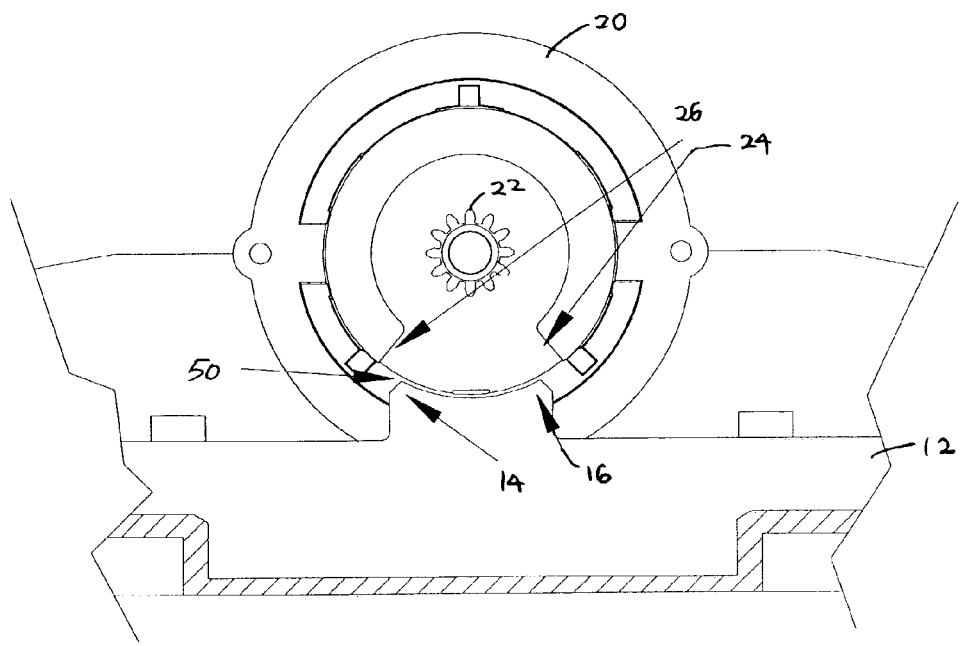
FIG. 4 is an elevational view of the rotational shaft and the frame in the steering wheel control device of FIG. 1.

As shown in FIG. 4, the counterclockwise rotational stop 24 and the clockwise rotational stop 26 are disposed at a stop radius from a center of the shaft 20 to rotate with the shaft 20 along paths of travel. The rotational stops 24, 26 rotate along a common, circular path of travel in this embodiment. The left frame stop 14 and the right frame stop 16 are disposed outside the path of travel to prevent direct contact between the counterclockwise rotational stop 34 with the left frame stop 14 and between the clockwise rotational stop 36 with the right frame stop 16. In FIG. 4, the left frame stop 14 and the right frame stop 16 are disposed at a distance from the center of the shaft 20 which is greater than the stop radius. A clearance gap 50 is desirably provided between the rotational stops 34, 36 and the frame stops 14, 16. In other embodiments, the rotational stops 34, 36 and frame stops 14, 16 may be configured differently to achieve the same results, for instance, by making use of different positioning along the longitudinal direction of the axis of the shaft 20 in addition to or instead of the different positioning in the radial direction from the center of the shaft 20.

Figure 5:
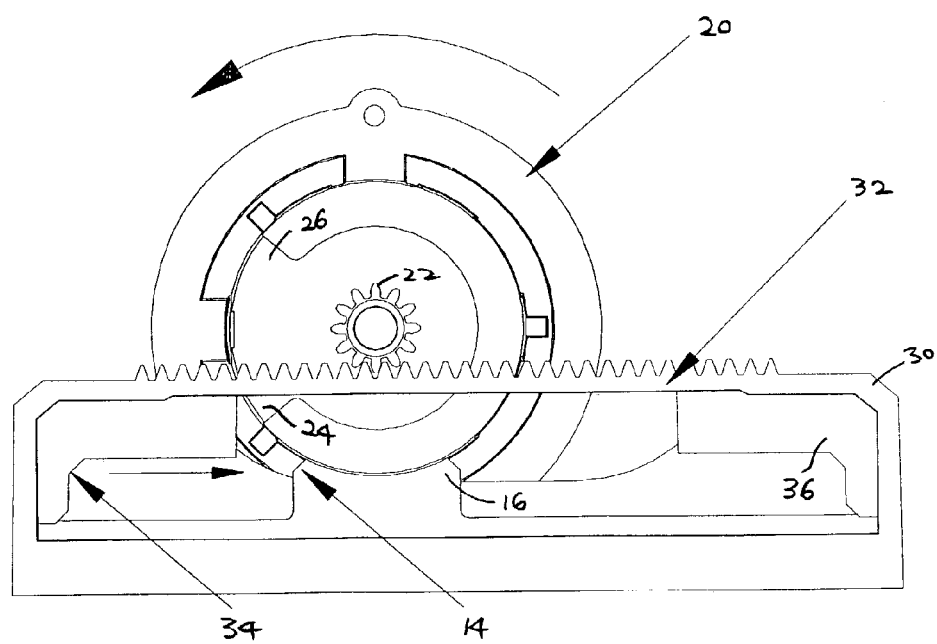
FIG. 5 is an elevational view of the rotational shaft, the multi-turn slider, and the frame in the steering wheel control device of FIG. 1.
Figure 6:
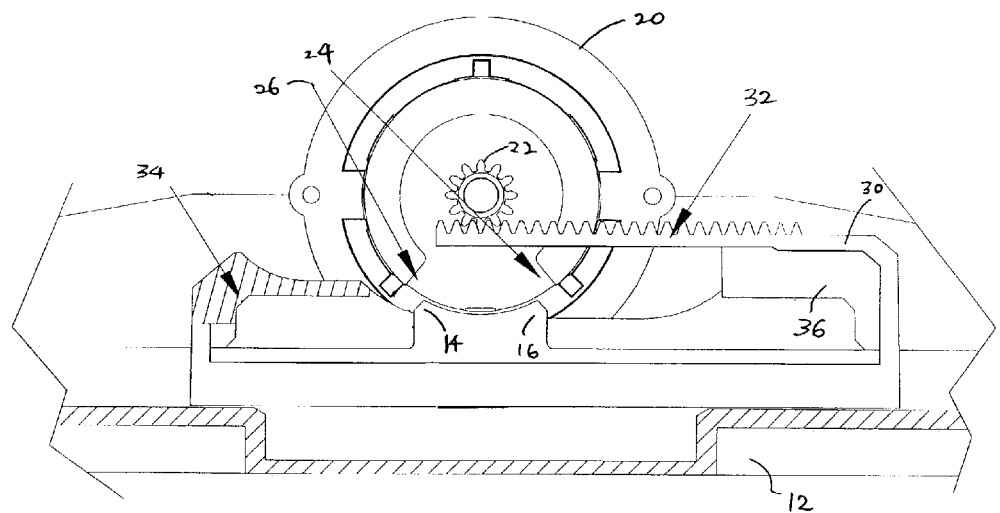
FIG. 6 is a partial cross-sectional view of the rotational shaft, the multi-turn slider, and the frame in the steering wheel control device of FIG. 1 illustrating movement of the multi-turn slider toward a position to stop further rotation of the shaft.
Figure 7:
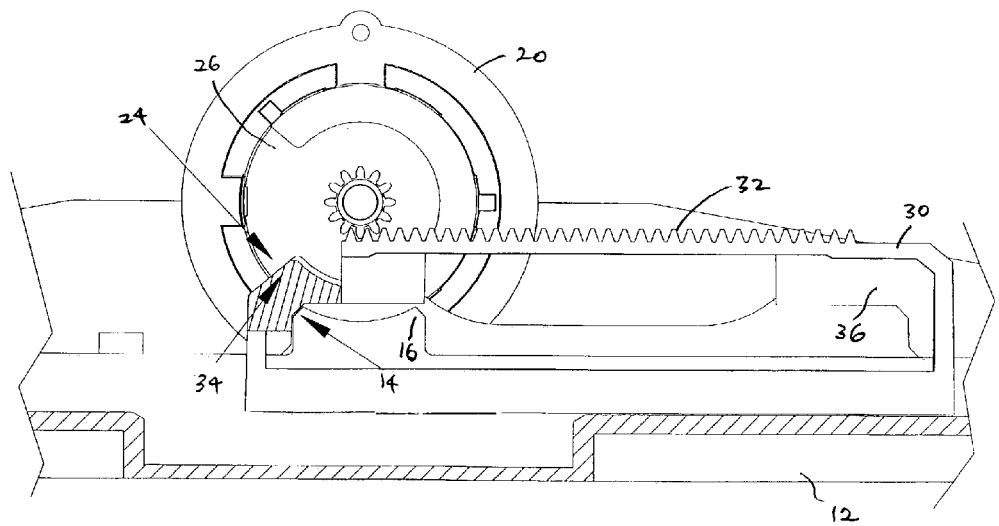
FIG. 7 is a partial cross-sectional view of the rotational shaft, the multi-turn slider, and the frame in the steering wheel control device of FIG. 1 illustrating the position of the multi-turn slider stopping further rotation of the shaft.

As the shaft 20 rotates in the counterclockwise direction, the left multi-turn stop 34 moves closer to the left frame stop 14, as seen in FIG. 5. The left multi-turn stop 34 moves further toward the left frame stop 14 in FIG. 6 after the shaft 20 has rotated in the counterclockwise direction for more than 180°. In FIG. 7, the counterclockwise stop 24 contacts the left multi-turn stop 34 after the shaft 20 has rotated in the counterclockwise direction for more than 360°. The shaft 20 continues to rotate a small amount more pushing the left multi-turn stop 34 into the left frame stop 14. This stops the movement of the multi-turn slider 30 and hence the rotation of the shaft 20. The operation of the control device 10 with the shaft 20 rotating in the clockwise direction is similar to that in the counterclockwise direction.

Figure 8:
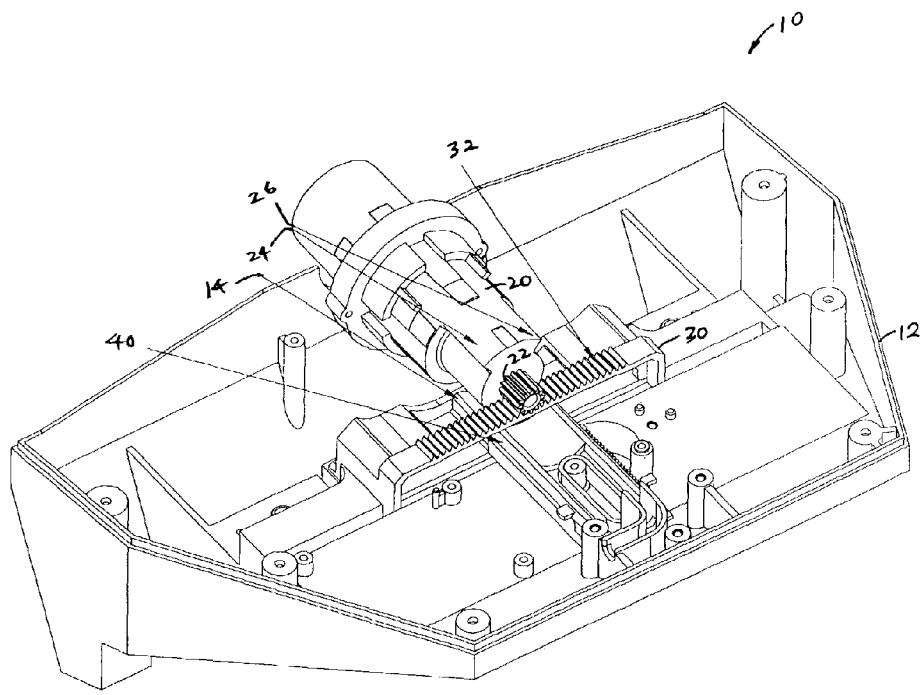
FIG. 8 is a perspective view of the steering wheel control device of FIG. 1 with the single-turn control member in a multi-turn mode position.
Figure 9:
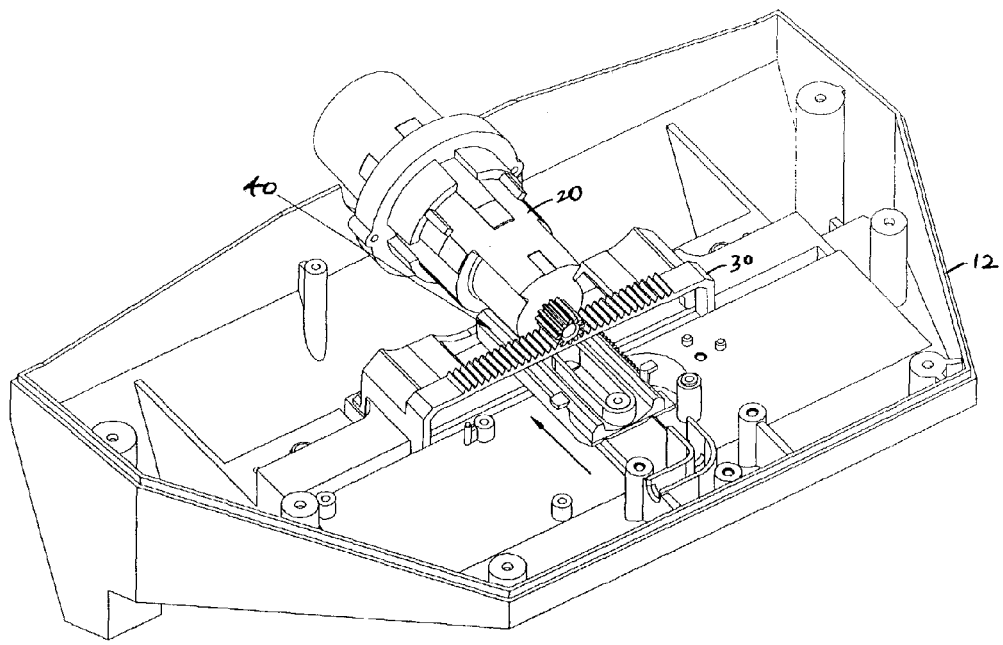
FIG. 9 is a perspective view of the steering wheel control device of FIG. 1 with the single-turn control member in a single-turn mode position.

FIG. 8 shows the single turn slider 40 in a multi-turn mode position in which the rotation of the shaft 20 is controlled by the multi-turn stops 34, 36 of the multi-turn slider 30 so as to have a rotational range of movement of greater than 360°. The single-turn stops 42, 44 are disposed outside the path of travel of the rotational stops 24, 26. In FIG. 9, the single turn slider 40 is moved to a single-turn mode position to restrict the rotational range of the shaft 20 to within 360° (i.e., within about 180° in the counterclockwise direction and about 180° in the clockwise direction).

Figure 10:
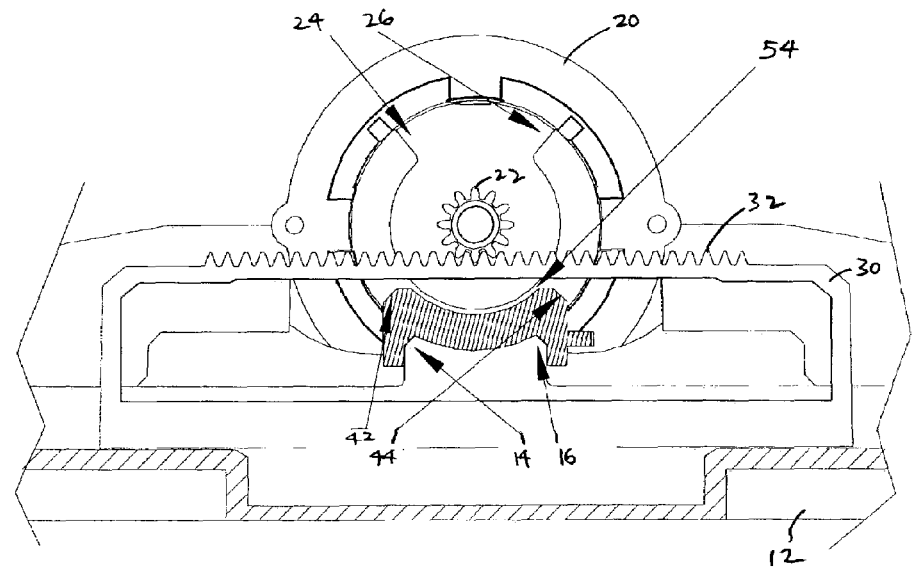
FIG. 10 is a partial cross-sectional view of the steering wheel control device of FIG. 1 with the single-turn control member in a single-turn mode position.
Figure 11:
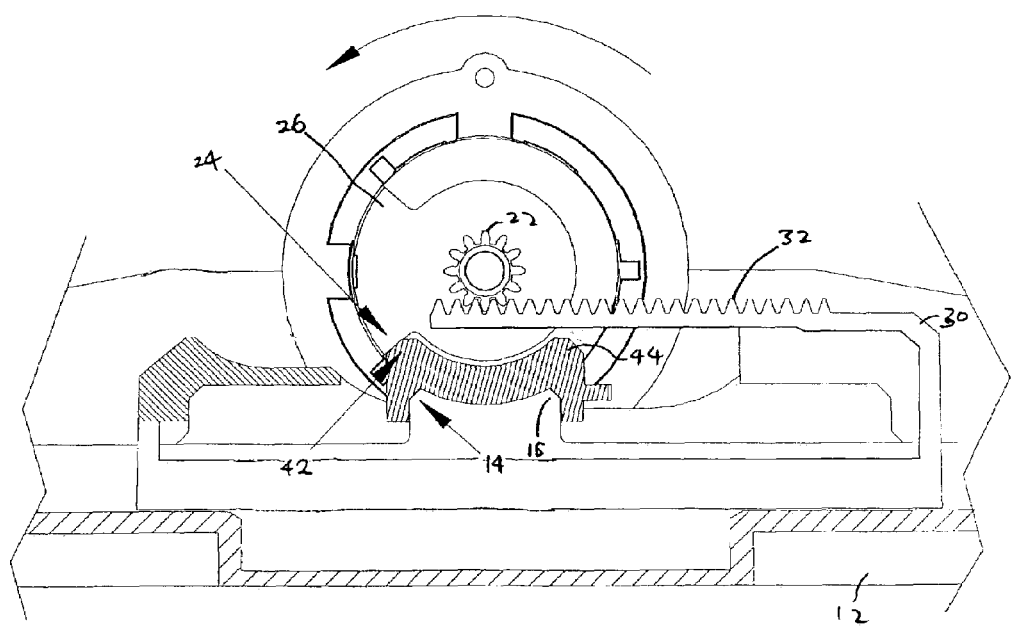
FIG. 11 is a partial cross-sectional view of the steering wheel control device of FIG. 1 with the single-turn control member in a single-turn mode position illustrating stopping of further rotation of the shaft by the single-turn control member.

As best seen in FIG. 10, in the single-turn mode position, the single-turn stops 42, 44 are disposed within the path of travel of the rotational stops 24, 26 of the shaft 20. The shaft 20 is shown in the neutral position. The single-turn stops 42, 44 are spaced from the remaining portion of the shaft 20 by a clearance gap 54. As illustrated in FIG. 11, the left single-turn stop 42 prevents the shaft 20 from rotating in the counterclockwise direction by more than 180° from the neutral position. The left single-turn stop 42 contacts and is blocked by the left frame stop 14 in this stop position. Similarly, the right single-turn stop 44 prevents the shaft 20 from rotating in the clockwise direction by more than 180° from the neutral position.

It is to be understood that the above description is intended to be illustrative and not restrictive. Many embodiments will be apparent to those of skill in the art upon reviewing the above description. For example, the gear mechanism for engaging the timing member 22 and the timing rack 32 may be replaced by a different coupling mechanism. The timing rack 32 may be disposed above the timing gear 22 and faces downward, so that the sliding movement of the multi-turn slider is opposite from the embodiment shown and described. The scope of the invention should, therefore, be determined not with reference to the above description, but instead should be determined with reference to the appended claims along with their full scope of equivalents.

What is claimed is:

1. A control device for a steering wheel, the control device comprising:
    a frame including a left frame stop and a right frame stop;
    a rotational shaft including a timing member, a counterclockwise rotational stop and a clockwise rotational stop, the rotational shaft being rotatable relative to the frame in clockwise and counterclockwise directions from a neutral position; and
    a multi-turn slider including a timing rack configured to engage the timing member of the rotational shaft and to slide in opposite directions relative to the frame with the timing member rotating in counterclockwise and clockwise directions, the multi-turn slider including a left multi-turn stop disposed on a left side of the timing rack and a right multi-turn stop disposed on a right side of the timing rack to move with the timing rack;
    wherein the left frame stop of the frame blocks the left multi-turn stop of the multi-turn slider to prevent further rotation of the rotational shaft in the counterclockwise direction only after the rotational shaft is turned from the neutral position counterclockwise by more than 180°; and
    wherein the right frame stop of the frame blocks the right multi-turn stop of the multi-turn slider to prevent further rotation of the rotational shaft in the clockwise direction only after the rotational shaft is turned from the neutral position clockwise by more than 180°.

2. The control device of claim 1 wherein the timing member comprises a timing gear and the timing rack comprises a timing gear rack.

3. The control device of claim 1 wherein the left frame stop blocks the left multi-turn stop and the left multi-turn stop blocks the counterclockwise rotational stop to prevent further rotation of the rotational shaft in the counterclockwise direction only after the rotational shaft is turned from the neutral position counterclockwise by more than 360°, and wherein the right frame stop blocks the right multi-turn stop and the right multi-turn stop blocks the clockwise rotational stop to prevent further rotation of the rotational shaft in the clockwise direction only after the rotational shaft is turned from the neutral position clockwise by more than 360°.

4. The control device of claim 1 wherein the left multi-turn stop being spaced from the left frame stop by a distance substantially equal to a distance between the right multi-turn stop and the right frame stop with the rotational shaft in the neutral position.

5. The control device of claim 1 wherein the left frame stop and the right frame stop are formed as a single frame stop member having a left side for blocking the left multi-turn stop and a right side for blocking the right multi-turn stop of the multi-turn slider.

6. The control device of claim 1 wherein the counterclockwise rotational stop and the clockwise rotational stop are formed as a single rotational stop member having one side for contacting the left multi-turn stop and another side for contacting the right multi-turn stop of the multi-turn slider.

7. The control device of claim 1 wherein the counterclockwise rotational stop and the clockwise rotational stop are disposed at a stop radius from a center of the rotational shaft to rotate with the rotational shaft along a path of travel, and wherein the left frame stop and the right frame stop are disposed outside the path of travel to prevent the left frame stop from blocking the counterclockwise rotational stop and between the right frame stop from blocking the clockwise rotational stop.

8. The control device of claim 7 further comprising a single-turn control member having a left single-turn stop and a right single-turn stop, the single-turn control member being movable, between a multi-turn mode position in which the left single-turn stop and the right single-turn stop are disposed outside the path of travel of the counterclockwise rotational stop and the clockwise rotational stop, and a single-turn mode position in which the left single-turn stop is disposed within the path of travel of the counterclockwise rotational stop to prevent rotation of the rotational shaft in the counterclockwise direction by more than 180° from the neutral position and the right single-turn stop is disposed within the path of travel of the clockwise rotational stop to prevent rotation of the rotational shaft in the clockwise direction by more than 180° from the neutral position.

9. The control device of claim 8 wherein the left single-turn stop and the right single-turn stop are formed as a single single-turn stop member having a left side for blocking the counterclockwise rotational stop and a right side for blocking the clockwise rotational stop of the rotational shaft.

10. The control device of claim 8 wherein, in the single-turn mode position, the left single-turn stop is disposed within the path of travel of the counterclockwise rotational stop and is blocked by the left frame stop to prevent rotation of the rotational shaft in the counterclockwise direction by more than 180° from the neutral position, and the right single-turn stop is disposed within the path of travel of the clockwise rotational stop and is blocked by the right frame stop to prevent rotation of the rotational shaft in the clockwise direction by more than 180° from the neutral position.

11. The control device of claim 1 wherein the left frame stop blocks the left multi-turn stop and the left multi-turn stop blocks the counterclockwise rotational stop to prevent further rotation of the rotational shaft in the counterclockwise direction only after the rotational shaft is turned from the neutral position counterclockwise by more than 180°; and wherein the right frame stop blocks the right multi-turn stop and the right multi-turn stop blocks the clockwise rotational stop to prevent further rotation of the rotational shaft in the clockwise direction only after the rotational shaft is turned from the neutral position clockwise by more than 180°.

12. A control device for a steering wheel, the control device comprising:
a frame including a left frame stop and a right frame stop;
a rotational shaft including a timing member, a counterclockwise rotational stop and a clockwise rotational stop, the rotational shaft being rotatable relative to the frame in clockwise and counterclockwise directions from a neutral position to move the rotational stops along paths of travel;
a single-turn control member having a left single-turn stop and a right single-turn stop, the single-turn control member being movable, between a multi-turn mode position in which the left single-turn stop and the right single-turn stop are disposed outside the paths of travel of the counterclockwise rotational stop and the clockwise rotational stop, and a single-turn mode position in which the left single-turn stop is disposed within the path of travel of the counterclockwise rotational stop to prevent rotation of the rotational shaft in the counterclockwise direction by more than 180° from the neutral position and the right single-turn stop is disposed within the path of travel of the clockwise rotational stop to prevent rotation of the rotational shaft in the clockwise direction by more than 180° from the neutral position; and
a multi-turn slider including a timing rack configured to engage the timing member of the rotational shaft and to slide in opposite directions relative to the frame with the timing member rotating in counterclockwise and clockwise directions, the multi-turn slider including a left multi-turn stop disposed on a left side of the timing rack and a right multi-turn stop disposed on a right side of the timing rack to move with the timing rack;
wherein, with the single-turn control member in the multi-turn mode position, the left frame stop blocks the left multi-turn stop of the multi-turn slider to prevent further rotation of the rotational shaft in the counterclockwise direction only after the rotational shaft is turned from the neutral position counterclockwise by more than 180°, and the right frame stop blocks the right multi-turn stop of the multi-turn slider to prevent further rotation of the rotational shaft in the clockwise direction only after the rotational shaft is turned from the neutral position clockwise by more than 180°.

13. The control device of claim 12 wherein, with the single-turn control member in the multi-turn mode position, the left frame stop blocks the left multi-turn stop and the left multi-turn stop blocks the counterclockwise rotational stop to prevent further rotation of the rotational shaft in the counterclockwise direction only after the rotational shaft is turned from the neutral position counterclockwise by more than 360°, and wherein the right frame stop blocks the right multi-turn stop and the right multi-turn stop blocks the clockwise rotational stop to prevent further rotation of the rotational shaft in the clockwise direction only after the rotational shaft is turned from the neutral position clockwise by more than 360°.

14. The control device of claim 12 wherein, with the single-turn control member in the single-turn mode position, the left single-turn stop is disposed within the path of travel of the counterclockwise rotational stop and is blocked by the left frame stop to prevent rotation of the rotational shaft in the counterclockwise direction by more than 180° from the neutral position, and the right single-turn stop is disposed within the path of travel of the clockwise rotational stop and is blocked by the right frame stop to prevent rotation of the rotational shaft in the clockwise direction by more than 180° from the neutral position.

15. The control device of claim 12 wherein the left frame stop and the right frame stop are formed as a single frame stop member having a left side for blocking the left multi-turn stop and a right side for blocking the right multi-turn stop of the multi-turn slider.

16. The control device of claim 12 wherein the counterclockwise rotational stop and the clockwise rotational stop are formed as a single rotational stop member having one side for contacting the left multi-turn stop and another side for contacting the right multi-turn stop of the multi-turn slider.

17. A control device for a steering wheel, the control device comprising:
a frame including a left frame stop and a right frame stop;
a rotational shaft including a timing member, a counterclockwise rotational stop and a clockwise rotational stop, the rotational shaft being rotatable relative to the frame in clockwise and counterclockwise directions from a neutral position; and multi-turn means, coupled with the timing member of the rotational shaft, for prevent further rotation of the rotational shaft in the counterclockwise direction only after the rotational shaft is turned from the neutral position counterclockwise by more than 180° and preventing further rotation of the rotational shaft in the clockwise direction only after the rotational shaft is turned from the neutral position clockwise by more than 180°.

18. The control device of claim 17 wherein the left frame stop and the right frame stop are formed as a single frame stop member having a left side for blocking the left multi-turn stop and a right side for blocking the right multi-turn stop of the multi-turn slider.

19. The control device of claim 17 wherein the counterclockwise rotational stop and the clockwise rotational stop are formed as a single rotational stop member having one side for contacting the left multi-turn stop and another side for contacting the right multi-turn stop of the multi-turn slider.

20. The control device of claim 17 further comprising single-turn means, operable between a multi-turn mode and a single-turn mode, for preventing rotation of the rotational shaft in the counterclockwise direction by more than 180° and in the clockwise direction by more than 180° from the neutral position in the single-turn mode, and not interfering with rotation of the rotational shaft in the multi-turn mode.

* * * * *